March 22, 1966 A. A. KNOX 3,241,781

ENDLESS TAPE CARTRIDGE

Filed Aug. 21, 1963 2 Sheets-Sheet 1

INVENTOR
Austin A. Knox
BY
Pennie, Edmonds, Morton, Taylor and Adams
ATTORNEYS

March 22, 1966 A. A. KNOX 3,241,781

ENDLESS TAPE CARTRIDGE

Filed Aug. 21, 1963 2 Sheets-Sheet 2

INVENTOR
Austin A. Knox
BY
Pennie, Edmonds, Morton, Taylor and Adams
ATTORNEYS

United States Patent Office 3,241,781

Patented Mar. 22, 1966

3,241,781
ENDLESS TAPE CARTRIDGE

Austin A. Knox, Worcester, Mass., assignor to The Audiotape Corporation, a corporation of Delaware Filed Aug. 21, 1963, Ser. No. 303,637
5 Claims. (Cl. 242—55.19)

The present invention is a continuation-in-part of my co-pending application Serial No. 82,425, filed January 13, 1961 and now Patent No. 3,126,163, for Endless Recorder Tape Cartridge and relates to a tape cartridge unit having a tape coil supporting disc and cooperating hub about which an endless coil of tape is adapted to be wound with one edge supported on the disc and in which the hub and disc are rotated about a comon axis solely by frictional engagement of the tape therewith as the latter is fed by separate means away from the innermost convolution of the coil, through a predetermined path and back to the coil at its outermost convolution. More particularly, the cartridge unit of the present invention includes a hub member and disc member that are rotatably mounted with respect to both the cartridge housing and with respect to each other in such a manner that rotation of the two members effected by frictional engagement of the tape therewith causes the members to rotate at different predetermined speeds whereby the tension in the coiled tape will remain substantially constant through repeated unwinding and rewinding operations.

Presently, tape cartridge units within which an endless coil of tape is fed from its innermost convolution to its outermost convolution by constant speed feeding means disposed in suitable recording and reproducing apparatus employ hub and disc members which are arranged to rotate as a unit whereby the angular velocity of the hub and the disc is the same while the linear velocity of any portion of these members continuously increases as the distance from the axis of rotation increases.

The above mentioned angular velocity of the disc and hub members in these cartridge units is primarily determined by the angular velocity of the innermost convolution of the coil as it is fed away from the coil since at this point the tape is frictionally driving the hub with little slippage between the two. At the innermost convolution, therefore, the linear velocity of the tape and the linear velocity of the hub periphery are substantially equal. It also follows that since the tape is being fed to the outermost convolution of the coil by separate tape feeding mechanism disposed in the recording and reproducing apparatus which is operating at a constant speed, the linear velocity of the tape as it is fed back onto the coil is substantially equal to the linear velocity of the innermost convolution. As stated above, however, these cartridge units employ a disc which is fixed to the hub, and this produces a linear velocity of the disc at its periphery which is much greater than the linear velocity at the hub and consequently much greater than the linear velocity of the tape at the outermost convolution of the coil. The difference in linear velocities of the disc and tape produces a slippage between the disc and edge of the coiled tape with the disc continually tending to move the tape at a linear speed greater than the speed of the tape leaving the innermost convolution of the coil. As the tape approaches the hub during the unwinding and rewinding operation, the degree of slippage between the disc and tape will decrease until the disc and tape are traveling at substantially the same linear speed when the tape leaves the innermost convolution. The frictional forces acting between the edge of the coiled tape and the disc member and the frictional forces acting between the opposed surfaces of the coiled tape tend to tighten the tape about the hub member and as the tape is repeatedly unwound and rewound on the disc, the increasing tightness of the coil convolutions produces a separation between the convolutions. This separation is known as an "eye" and takes on a general moon shape. The eye originates near the innermost convolution and progresses outwardly while increasing in size until it reaches the outermost convolution. It then proceeds to form again at the center of the coil at its enlarged size and progresses outwardly as before.

The primary disadvantages of these conventional cartridge units wherein the hub and disc are fixed to rotate as a unit stem from the ever tightening effect of the coil about the hub. The tightening of the tape will eventually cause it to lock onto the hub with such force that the separate feeding means will be unable to withdraw any further tape from the innermost convolution. The disadvantages of this to the uses of the cartridge are apparent. The continual tightening of the convolutions of the coil is in part caused by the relative linear speed of the disc at any point along a radius of the disc with respect to the tape which is disposed immediately above that point, and as any portion of the tape progresses from one side of the eye to the other while moving inwardly along the disc, the higher linear speed of the disc at this point will tend to cause a loop to be formed in the tape. This loop generally appears across the eye as an S loop and the disadvantage arising from its formation resides in the fact that it will become folded into the coil convolutions causing an increase in tension and jamming of the cartridge.

A number of attempts have been made, in the past, to avoid these disadvantages by constructing cartridges in which the hub and disc members are positively driven at predetermined speeds independently of the frictional driving forces existing between the tape and the two members. These arrangements, however, require accurate controls and the speeds of the members must be readjusted to different values for each size cartridge unit.

According to the teachings of the present invention, applicant has devised a cartridge construction in which the tension in the convolutions of the coiled tape will remain substantially constant through repeated unwinding and rewinding operations and in which the so-called eye will remain constant in size and position.

By having the hub member constructed for rotation independently of the disc member, the latter may be allowed to take on an angular speed which is determined by the frictional forces exerted by the edge of the tape and substantially independent of the speed of the hub member. In this manner, the size of the eye and its position may not only be maintained substantially constant but the linear speed of the portion of the disc disposed immediately below the eye may be held at a value equal to the linear speed of the tape crossing from one side of the eye to the other with the effect of thereby preventing the formation of any undesirable S loop in the tape. With the disc mounted for rotation independently of the hub and driven solely by the frictional forces exerted by the edge of the coiled tape, the angular velocity of the disc will be equal to the average of the angular velocities of each convolution of the coiled tape. And since the linear velocities of any two portions of the tape along the radius of the coil are substantially equal and the angular velocity of the tape continually decreasing as the distance from the center of the coil increases, some point will exist along the radius of the disc where the opposed coil convolution will be rotating at the same angular speed as the disc. This point is the point where the edge surface area of the portion of the coil in frictional engagement with the disc on one side of the point is equal to the edge surface area of the coil on the other side whereby balanced frictional forces are developed in each portion of the coil. At this point the eye will be formed and since the angular velocities of the disc and opposed tape are here equal, their linear velocities will be equal with the result that there will be no tendency for an undesirable S loop to be formed. Furthermore, the tendency of the tape to tighten its wrap about the hub is substantially reduced with the result that the life of the cartridge is greatly increased over the life of similar cartridges in which the hub and disc are fixed to rotate as a unit.

In addition to the above construction, another object of the invention is to provide a two-part, compact magazine or cartridge of non-metallic construction wherein the two portions thereof each have built-in connector or latching and positioning elements which align and rigidly secure the magazine casing sections together in sealing relation but which are capable of being easily detached from each for separation of the casing sections when replacement or inspection of the magazine contents is necessary or desired.

Another object of the invention is to provide a hub member of specific construction which will avoid bunching or fouling of the tape at the hub and permit the tape to be smoother led away from the coil.

Another object is to provide a magazine for a transducer tape including a novel tape holding and tensioning means.

Another object of the invention is to provide a tape magazine that is low in manufacturing costs, light in weight, compact, rigid and of non-magnetic material and sufficiently strong to withstand rough handling without damage.

The foregoing and other objects of the invention will be understood from the following description which, taken in connection with the accompanying drawings, disclose the preferred embodiment thereof.

Referring to the drawings.

As illustrated, the tape magazine, package or cartridge is designated generally at 10 in FIG. 3 and comprises a major casing or bottom portion 11, hereinafter referred to as the casing and a complementary cover portion 12 snugly engaging casing 11. These magazine portions are preferably, but not necessarily, constructed of a suitable plastic material of suitable wall thickness consistent with appropriate wall strength and lightness and may be transparent or opaque as desired.

Figure 1:
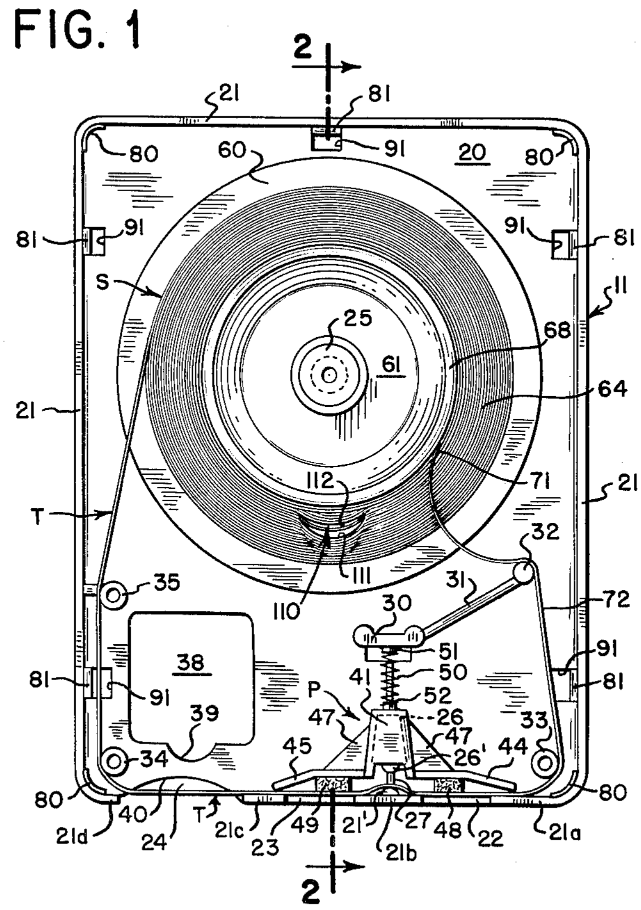
FIG. 1 is a plan view of the tape magazine with the cover member removed.
Figure 2:
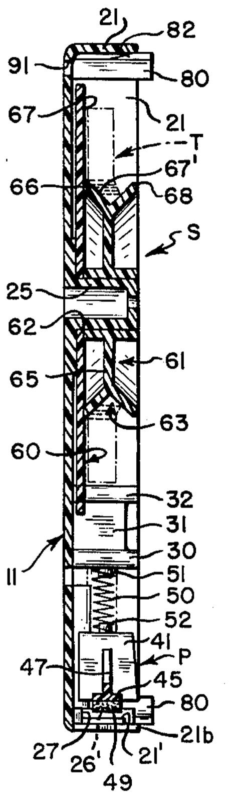
FIG. 2 is a vertical sectional view of the magazine taken on line 2—2 of FIG. 1.
Figure 3:
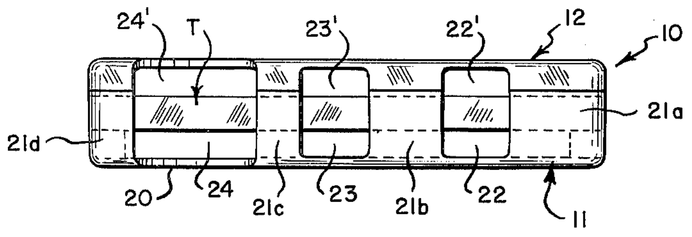
FIG. 3 is a front view of the magazine.

Noting FIGS. 1 to 3, the casing 11 comprises a bottom flat wall 20 from which extends a peripheral side wall 21 normal thereto of uniform height about its periphery, its top edge being parallel to bottom wall 20. Wall 21 at the front side (FIGS. 1 and 3) of the magazine is provided with three spaced, preferably rectangular apertures 22, 23 and 24 dividing the wall into narrow sections, section **21*a* lying to the right of aperture 22, section 21*b* extending between apertures 22 and 23, section 21*c* extending between apertures 23 and 24, while section 21*d* is disposed to the left of aperture 24. Aperture 24 is preferably of a length greater than apertures 22 and 23, which are both of the same length. Apertures 22 and 23 which are provided for the transducer head (not shown) are adapted to extend a slight distance therein in operative relation to the tape T, while aperture 24** is provided for association with the tape driving means, as hereinafter more fully explained. The cover

12 has portions cooperating to complete apertures 22–24 as explained later on.

As shown in FIG. 2, an integral hollow lug 25, formed in the bottom wall of the casing 11 extending normal thereto and the same height as peripheral wall 21, forms a spindle for a composite tape spool structure S. The spool S, as indicated in FIG. 1, is located medially of two sides of the casing 11 and in the back portion thereof relatively remote with respect to apertures 22–24.

Spaced to provide tape passage clearance behind the casing front side wall section **21*b*, is a guide lug 26 integral with the casing bottom and which freely and slidably receives a frictional holding and tape tensioning member P. The lower portion of guide lug 26 is integrally connected to peripheral wall portion 21 of the casing by a tape-guiding web 27. The casing wall portion 21*b* and lug 26 have tensioning ribs or tape-guiding surfaces 21′ and 26′, respectively, located abreast of each other as shown in FIGS. 1 and 2. Spaced a suitable distance behind guide lug 26 is a spring abutment 30 likewise integral with casing 11. Connected thereto, as indicated in FIG. 1, by means of a reinforcing web 31 is a tape-guiding lug or post 32, located rearwardly from and outwardly toward the peripheral wall 21 of the casing. Additional tape guiding posts 33, 34 and 35, which may be hollow, are disposed in the forward portion of the casing (FIG. 1) and spaced sufficiently from peripheral side wall 21 to provide tape-guiding slots with tape-guiding webs connected to the front peripheral wall 21 in a manner comparable to web 27 (FIG. 2). Posts 33 and 34 are respectively located at each of the two forward corners of casing 11**.

In the bottom wall 20 of the casing is provided a relatively large rectangular aperture 38 having a semicircular indentation 39 in its forward edge, the aperture 38 being located abreast of and adjacent to aperture 24 in the peripheral side wall of the casing. A portion of the casing bottom wall 20, forming with the casing peripheral side wall 21 the aperture 24, is arcuately indented or concave at 40 for drive clearance purposes. Aperture 24 is adapted to provide for frictional drive engagement of the tape at its opposite sides by suitable frictional drive roller means (not shown) when the magazine is mounted in the recording and reproducing apparatus with which it is to be used.

Figure 7:
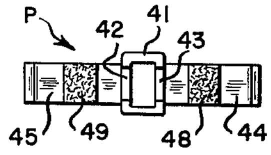
FIG. 7 is a front view of the tape holding tensioning member.

The tape holding and tensioning member P (FIGS. 1 and 7) comprises a central hollow body portion 41 of slightly rhombic configuration in vertical section that has side wall portions 42, 43, of uniform thickness which slide freely on and are guided by the complementary-shaped sides of the guide lug 26 in a direction normal to portion **21*b* of the casing side wall. Extending outwardly from body portion 41 of tension member P are arms 44 and 45, one at each side thereof and appropriately reinforced at 47. The arms are of equal length with the end of arm 44 inclined toward wall section 21*a* and the end of arm 45 toward wall section 21*c*. Intermediate their lengths the arms 44, 45 have felt or similar friction pads 48 and 49** mounted thereon in facing relation to apertures 22 and 23, respectively.

A relatively weak compression spring 50 is interposed between abutment 30 and the tape tensioning member P and is held in position therebetween by engaging over suitable studs 51, 52 on members 30 and P, respectively. Spring 50 urges member P into engagement with the endless tape T (FIG. 1) whereby the felts 48, 49 effect a light frictional engagement with the transducer head components in apertures 22, 23 when the magazine is mounted in a recording and reproducing apparatus. Also, when the magazine is free of such apparatus, the spring 50 thrusts the ends of arms 44, 45 and the portions of the tape T in front of them into frictional engagement with sections **21*a* and 21*c* of casing side wall 21** to hold and maintain the open loop of the tape in position within the magazine regardless of the position in which it may be disposed.

The tape spool S (FIGS. 1 and 2) is rotatably mounted on hollow spindle 25 of the casing 11.

The spool S is composed of two component members 60 and 61. The component 60 comprises a flat circular disc or flange element having a central aperture 62 rotatably mounted on the spindle 25.

The other component member 61 of the spool S which forms the hub portion thereof, comprises pulley shaped element having one edge in contact with spool flange 60 and rotatably mounted on the spindle 25 with respect to both the casing 11 and disc 60. It is of suitable thickness and the outer peripheral surface thereof defines a V-shaped groove 63 extending radially outwardly of the spindle 25. This V-shaped groove 63, in turn, defines the tape receiving surface of the hub and due to its contour, the coil convolutions 64 of the tape will be held substantially perpendicular with respect to the disc 60 even as they approach the hub. With this double slant or V, only the innermost convolution of the tape will twist to rise out of the center of the rotating mass as the tape is pulled by the tape feeding mechanism of the recording and reproducing apparatus and at no time will the tape twist before it comes into direct engagement with the hub and is being pulled upwardly. This elimination of adjacent inner convolutions bending together tends to increase the life of the tape and any coating on the tape since additional stresses that are placed on the tape backing when a number of convolutions are twisted together about the hub are eliminated. Furthermore, since all but the innermost convolutions of the tape coil are maintained perpendicular to the disc, substantially no energy is dissipated by forces tending to separate the hub from the disc as would result if a number of the adjacent innermost convolutions were bent as a unit. The twisting of only the innermost convolution of the coil also has the effect of making it easier to pull the tape away from the coil and since the innermost convolution is twisted only when it is being pulled upwardly, there is no tendency for tape to slip underneath the hub.

As shown in FIG. 2, the bottom of the hub 61 is raised at 65 so as to present only a limited edge 66 in frictional contact with the disc 60. This in turn more readily allows the disc and hub to rotate relative to each other as they are both driven by frictional engagement with the tape T. To further decrease the frictional drag between the hub and disc, the latter may be provided with a suitable graphite coating 67. This coating may be deposited on the upper surface of the disc 60 so as to extend under the edge 66 of the hub 61 and under the lower edges of the coiled tape T. The graphite coating under the tape will have the additional effect of reducing the static electricity that normally tends to build up in the coil.

In order to insure that the tape will not become bunched at the hub thereby requiring a greater pulling force before the innermost convolution may be pulled away from the coil, the V-shaped groove is shaped to present a smooth incline 67' leading away from the disc 60. With this construction the tape will pass smoothly from the disc to the hub without any additional pulling force being required.

As shown in FIG. 2 the hub 61 has an upper rounded edge 68. This is provided so that the tape will not be injured by its sliding movement over the edge of the hub as it is pulled away from the coil. In the preferred embodiment an upper edge rounded to a radius of about 1/32" with the angle presented between the surfaces of the V-shaped groove being about 120° has been found satisfactory.

When the composite tape spool S is positioned on spindle 25 in the casing, its upper edge 68 lies substantially in the plane of the upper edge of casing peripheral wall 21 that is parallel to the bottom wall 20 (FIG. 3).

Noting FIGURE 1, the endless magnetizable tape T is spirally wound around the hub element 61 of the spool in a series of convolutions to form coil 64. The innermost coil of the tape feeds off from the spool at the point 71 to form the beginning of an open loop 72 that passes around tape guide abutments 32, 33, thence past the transducer head apertures 22, 23, drive aperture 24, abutments 34, 35 and back to the spool to form the outermost convolution of coil 64.

The casing 11 has interiorly at each of its four corners an arcuate cover-aligning lug 80 that extends up from bottom wall 20 to a point appreciably above the upper edge of the peripheral side wall 21. The wall 21, except at its front wall, has at points throughout its length a plurality of spaced slightly inwardly extending triangular projections or lugs 81 that provide latching shoulders 82, as indicated in FIG. 2, for engagement with the cover latch elements hereinbefore referred to and which will now be more fully described.

Figure 6:
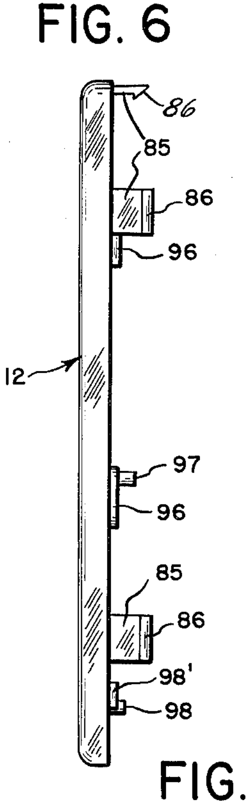
FIG. 6 is a side view of the cover member.
Figure 5:
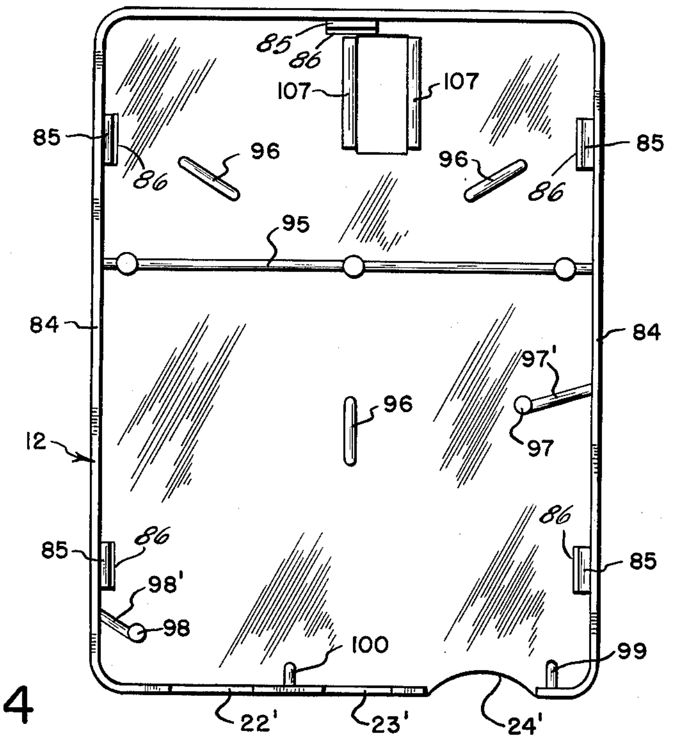
FIG. 5 is an inside plan view of the cover member.
Figure 4:
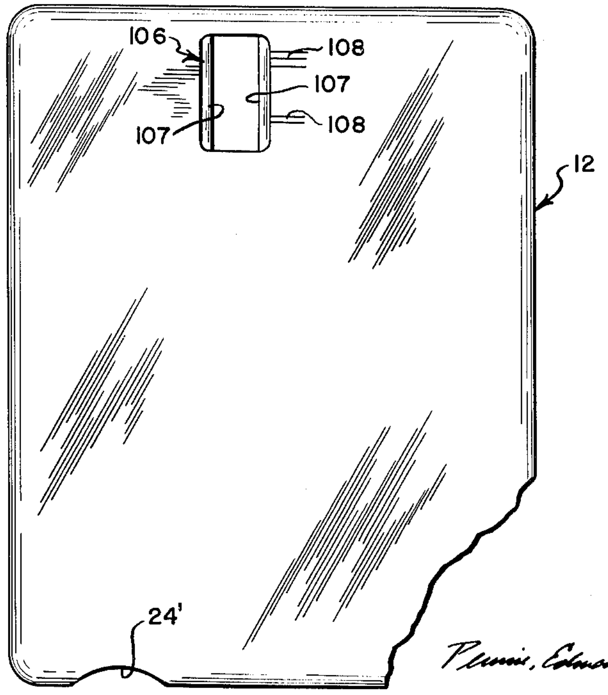
FIG. 4 is a plan view of the member cover.

The cover 12 is complementary in shape and over-all dimensions to the casing 11, though of lesser depth, its peripheral side wall 84 that is of uniform height and planar or flat between its arcuate corners being adapted to fit snugly and lightly against the upper straight edge of side wall 21 of the casing to seal against the admission of dirt and dust. Cover 12 has a number of integral and spaced partially resilient latch elements 85 each having an inclined latching shoulder 86, the latching elements extending integrally downwardly from, and parallel to, the inside surface of the peripheral wall 84 of the cover, noting FIGS. 5 and 6. The spaced cover latch elements correspond in number and spacing to latch lugs 81 of the casing 11, the latching shoulders 86 of the cover lugs 85 being adapted to spring over and latchingly engage shoulders 82 of the casing lugs 81 to rigidly hold the cover on the casing in tightly closed and sealing relationship when the two magazine components 11, 12 are pressed together to form a unitary structure.

In order to enable the casing and cover members to be separated whenever desired after having been latched together in closed relationship, the casing bottom wall 20 has small apertures 91 disposed therein each in alignment with each of the latch structures through which a suitable tool may be inserted to slightly deflect the cover latch members 85 and effect their disengagement from the latching shoulders 82 of the casing. The release of the latching lugs permits the casing and cover members to be easily separated.

Extending transversely across the inner wall of the cover 12 and integral with its peripheral wall 84 is an integral web member 95. Web 95 not only reinforces and strengthents the cover 12, but also prevents the tape spool S from moving axially on its spindle 25 when the magazine is inverted or in other than an upright position.

To assure, under such conditions, that the tape convolutions 64 will also remain in spiral alignment, the cover has a plurality of relatively short radially extending web elements 96 extending downwardly from its inside cover wall that are of such depth and disposition as to extend proximate the edges of the coil convolutions 64 on spool S. In the embodiment illustrated three radial webs 96, disposed 120 degrees apart, are shown, though any desired number may be provided.

The cover has additional tape guiding means that coact with the various tape guiding means on the casing as previously described. These comprise guiding lugs 97, 98 and 99 that extend downwardly from the inside cover wall to a point below its peripheral wall 84, as shown, the lug 97 coacting with lug 35 of the casing 11 in guiding the tape open loop 72 back onto spool S while lugs 98 and 99 aid in guiding the open loop between guide lugs 33 and 34 past casing apertures 22, 23 and 24. Webs 97' and 98' coact with opposite webs of the casing to confine and maintain the tape in alignment with the coil convolutions 64 and centered in casing apertures 22, 23 and 24, portions of which are formed in wall 84 of the cover at 22′, 23′ and 24′.

Lug 100 forms a stop abutment engageable by stop surface 41 of the tape tensioning member P to limit the outward movement of the latter under the action of its spring 50.

To provide for visual inspection of the coil convolutions, particularly when the structural material of the magazine cover and/or casing members is opaque, a window opening 106 is formed in the rearward portion of the cover that overlies the coil convolutions when the spool is disposed in the magazine. Appropriate support ledges 107 are provided on two or more opposite edges of the opening to provide adequate support for a transparent window (not shown) that is adapted to be fixedly mounted within the window opening.

Scale graduations 108 may be provided in the material of the casing cover 12 adjacent the side of the window opening 106 to indicate the particular size or numerical extent of the coil convolutions 64 of the particular tape that may be present in the magazine.

To mount a tape in the magazine the cover 12 is first removed from casing 11 by first deflecting one of the cover latch members 85 by means of screwdriver or similar tool inserted thereunder by means of the associated tool aperture 91 in the casing. The cover being thus released at that point is deflected away from the casing and the same process is repeated at one or more other latch members 85 which causes the cover 12 to spring free of the casing 11. Spool S with its endless transducer or other tape T pre-wound thereon at 64 in the manner indicated in FIG. 1, is placed on casing spindle 25. The tape open loop portion 72 is then threaded around guide lugs 32 and 33 past the felts 48 and 49 on tape tensioning member P, thence past aperture 24 and around guide lugs 34 and 35.

As previously stated, the ends of arms 44, 45 of the tensioning member P under the bias of spring 50 yieldingly thrust small segments of the tape against portions 21*a* and 21*c* of the casing peripheral wall 21 to tension the tape and also maintain the tape statically in the position indicated in FIG. 1 regardless of the position of the magazine when not in use.

The cover 12 is then re-mounted on casing 11 by aligning cover latch members 85 with the latch lugs 81 of the casing and then pressing the cover down into intimate contacting to latch with the casing. The magazine is then ready for mounting in the magnetic or other type of recording and reproducing apparatus wherein the frictional drive roller of suitable construction engages the inner side of the tape T by extending through casing aperture 38. A capstan-mounted rubber or other type pinch roller (not shown) engages and bears frictionally against the opposite side of the tape, by protrusion through casing aperture 24 and the roller clearance 40 provided therein.

As the tape T is propelled around within the magazine by the drive means above referred to, it feeds onto the spool S at the left in FIG. 1 as the outer convolution of the tape coil while the innermost coil feeds off the spool in a slightly oblique manner at 71 from the righthand side as also indicated in FIG. 1. As the open loop 72 of the tape traverse the interior of the magazine it is propelled past the transducer head apertures 22 and 23 into which the transducer head components are adapted to be extended. Under these conditions the tape will be thrust inwardly against felts 48, 49 of the pressure member P which, by the bias of spring 50, maintains the tape in operative relationship with the transducer head.

Since the hub and disc members are free to rotate with respect to each other, the hub will take on an angular speed substantially equal to the angular speed of the innermost convolution while the disc will take on an angular speed independent of the hub and equal to the average angular speed of the coil convolutions. An eye 110 will soon be formed in the coil due to the opposing frictional forces exerted by the outer and inner portions of the coiled tape on the disc and the difference in linear speeds of the disc in these portions with the result that a balanced condition will result with the angular speed of the disc equal to the angular speed of the tape where the eye 110 is formed. Equal angular speeds at this point will produce equal linear speeds and the tape will accordingly be passed inwardly from one side 111 of the eye to the other 112 without the formation of an S loop. Since the angular speed of the disc is only dependent on the frictional forces exerted by the edge of the coiled tape, which are balanced, the eye will remain stationary and have no tendency to increase in size once any original slack in the tape has been taken up. In addition, this balanced condition will have the effect of maintaining a substantially uniform tension in the convolutions of the coil with resulting longer life of the cartridge unit.

It will be obvious to those skilled in the art that various changes in material and arrangement may be made in the invention without departing from the spirit and scope set out in the following claims.

I claim:

1. A magazine for an endless recording tape comprising:

(a) a casing having a bottom wall and side walls;
(b) at least one aperture in one of said side walls;
(c) a spindle fixed to and extending perpendicularly from said bottom wall;
(d) a tape supporting disc separate from the spindle and rotatably mounted thereon adjacent said bottom wall for supporting one edge of a coil of tape;
(e) a hub substantially independent of and overlying said disc for engaging the innermost convolution of said coil of tape, said hub being rotatably mounted about said spindle and in engagement therewith whereby frictional forces created between said spindle and hub upon rotation of said hub are restrained from effecting rotation of said disc;
(f) tape guide means for directing the tape from the innermost convolution of said coil past said aperture and to the outermost convolution of said coil whereby movement of said tape past said guide means rotates said disc and hub substantially independently of each other by frictional engagement of the tape therewith; and
(g) a cover member secured to said casing for enclosing said coil of tape therein.

2. A magazine for an endless tape comprising:

(a) a casing having a bottom wall and side walls;
(b) a plurality of spaced apertures in one of said side walls;
(c) a stationary spindle integral with said bottom wall and extending in a direction normal thereto;
(d) an opening in said bottom wall adjacent one of said apertures;
(e) a tape coil supporting disc rotatably mounted on said spindle for supporting one edge of a coil of tape;
(f) a hub rotatably mounted about said stationary spindle and in engagement therewith for rotation with respect to said disc and having a V-shaped circumferential outer periphery for engagement with the innermost convolution of a coil of tape with one leg of said surface extending radially outwardly of said disc and obliquely into contact therewith;
(g) tape guide means for forming a loop of tape extending away from the innermost convolution, past said apertures and back to the outermost convolution of the coil; and
(h) a cover member for enclosing said disc, hub, and coil of tape from the outside except for the portion of the loop extending past said apertures.

3. A magazine for an endless tape as set forth in claim 2 in which the one face of said disc is coated with graphite at the point of contact with said hub.

4. A magazine for an endless tape as set forth in claim 3 in which the one face of said disc is coated with graphite in the area where said coil is adapted to be supported.

5. A magazine for an endless recording tape comprising:

(a) a casing having a bottom wall and side walls;

(b) a plurality of spaced apertures in one of said side walls;

(c) a stationary spindle extending perpendicularly from said bottom wall;

(d) a tape coil supporting disc disposed with one side facing said bottom wall for substantially free rotation about said spindle;

(e) a graphite coating on the other side of said disc;

(f) a hub rotatably mounted directly about said spindle and in engagement therewith for substantially free rotation with respect to said spindle and said disc and having:

(i) an outer circumferential V-shaped surface with one leg of said surface extending obliquely into contact with the graphite coating on said disc and terminating in a plane substantially parallel to the plane of said disc, the other leg extending away from said disc and terminating in a rounded edge and both legs meeting at the apex of the V at an angle of about 120°;

(g) an endless coil of tape spirally wound on said disc and extending in a direction outwardly of said hub with the opposite edges of the innermost convolution thereof in engagement with the legs of said hub;

(h) tape guide means for directing the tape away from the innermost convolution, into a loop extending past said apertures and back to said coil at its outermost convolution whereby movement of said tape along said loop rotates said hub at an angular speed substantially equal to the angular speed of the innermost convolution and the disc at a predetermined fixed point along its radius at an angular speed substantially equal to the angular speed of the tape disposed immediately thereabove with the edge surface area of the convolutions of the coil on radially opposite sides of said point being equal to each other; and (i) a cover member for enclosing said coil of tape within said casing.

References Cited by the Examiner

UNITED STATES PATENTS

| | | | |
|---|---|---|---|
| 2,288,983 | 7/1942 | Weiss | 242—55.19 X |
| 2,426,838 | 9/1947 | Miller | 179—100.2 |
| 2,656,184 | 10/1953 | Eddy | 242—55.19 |
| 2,778,880 | 1/1957 | Eash | 242—55.19 X |
| 2,921,787 | 1/1960 | Cousino | 242—55.19 |
| 2,937,818 | 5/1960 | Zorn | 242—55.13 |
| 2,951,654 | 9/1960 | Steelman | 242—55.19 X |
| 3,025,012 | 3/1962 | Fries | 242—55.19 |
| 3,126,163 | 3/1964 | Knox | 242—55.19 |

MERVIN STEIN, *Primary Examiner.*